United States Patent
George Philip

(10) Patent No.: US 11,284,227 B2
(45) Date of Patent: Mar. 22, 2022

(54) MANAGING A NOTIFICATION OF AN INCOMING COMMUNICATION ON A WIRELESS DEVICE

(71) Applicant: QUALCOMM Incorporated, San Diego, CA (US)

(72) Inventor: Justin Antony George Philip, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/563,828

(22) Filed: Sep. 7, 2019

(65) Prior Publication Data
US 2021/0076171 A1    Mar. 11, 2021

(51) Int. Cl.
| | |
|---|---|
| *H04W 68/00* | (2009.01) |
| *H04W 4/20* | (2018.01) |
| *H04M 19/04* | (2006.01) |

(52) U.S. Cl.
CPC .......... *H04W 4/20* (2013.01); *H04M 19/041* (2013.01); *H04W 68/005* (2013.01)

(58) Field of Classification Search
CPC ........ H04W 68/005; H04W 4/90; G06F 3/167
See application file for complete search history.

(56) References Cited

U.S. PATENT DOCUMENTS

| | | | |
|---|---|---|---|
| 2006/0003814 A1* | 1/2006 | Moody | H04M 1/576 455/567 |
| 2007/0275767 A1 | 11/2007 | Steele | |
| 2009/0280782 A1 | 11/2009 | Storozuk | |
| 2013/0189959 A1* | 7/2013 | Deng | H04M 1/575 455/412.2 |
| 2013/0332721 A1 | 12/2013 | Chaudhri et al. | |
| 2015/0245185 A1* | 8/2015 | Park | H04W 4/16 455/414.1 |
| 2015/0256685 A1* | 9/2015 | Amberden | H04M 19/04 455/567 |
| 2016/0127531 A1* | 5/2016 | Halls | H04M 1/72536 455/404.2 |
| 2017/0034649 A1* | 2/2017 | Dotan-Cohen | H04W 24/02 |
| 2017/0149964 A1* | 5/2017 | Fitchmun | H04M 19/04 |
| 2018/0205824 A1* | 7/2018 | Rauenbuehler | H04M 3/543 |

OTHER PUBLICATIONS

International Search Report and Written Opinion—PCT/US2020/041453—ISA/EPO—dated Oct. 30, 2020 13 pages.

* cited by examiner

*Primary Examiner* — Khalid W Shaheed
(74) *Attorney, Agent, or Firm* — The Marbury Law Group, PLLC

(57) ABSTRACT

Various embodiments include methods, components and wireless devices configured to manage a presentation of the notification of an incoming communication on a wireless device. In some embodiments, a sender wireless device may send to a receiver wireless device a communication and a notification suggestion code including one or more notification suggestions that the receiver wireless device may determine to use for modifying a notification on the receiver wireless device.

25 Claims, 12 Drawing Sheets

MANAGING A NOTIFICATION OF AN INCOMING COMMUNICATION ON A WIRELESS DEVICE

BACKGROUND

Wireless communication systems are widely deployed to provide a variety of communication and information services. Wireless devices are capable of providing nearly ubiquitous access to communication services including voice, email, text messaging, and the like. Most wireless devices are configured to provide a visual, audible, tactile or other similar notification of an incoming or available call request, email, or text message. While sometimes useful, a notification may also be intrusive and disruptive, either for the user or for people nearby. While wireless devices can be turned off or all audio settings set to silence or "mute," this may cause a user to miss important messages or calls.

SUMMARY

Various aspects include methods of managing wireless devices to enable a sender wireless device to send to a recipient wireless device a suggestion that the recipient wireless device suppress one or more notification signals on the recipient wireless device associated with a received or incoming communication from the sender wireless device.

Various embodiments may include receiving, by a processor of a wireless device, an indication of an incoming communication, obtaining, by the processor, a notification suggestion code associated with the indication of the incoming communication, determining, by the processor, whether the notification suggestion code suggests modifying a notification of the incoming communication, and modifying, by the processor, the notification of the incoming communication in response to determining that the notification suggestion code suggests modifying the notification.

In some embodiments, the notification suggestion code may include an indication of whether the wireless device should mute the notification of the incoming communication. In some embodiments, the notification suggestion code may include one or more suggested options that the wireless device may determine to use for modifying the notification of the incoming communication. In some embodiments, modifying the notification of the incoming communication in response to determining that the notification suggestion code suggests modifying the notification may include muting, by the processor, the notification of the incoming communication on the wireless device.

In some embodiments, modifying the notification of the incoming communication in response to determining that the notification suggestion code suggests modifying the notification may include modifying, by the processor, the notification to display visible notification. In some embodiments, modifying the notification of the incoming communication in response to determining that the notification suggestion code suggests modifying the notification may include modifying, by the processor, the notification to provide a haptic notification.

In some embodiments, modifying the notification of the incoming communication in response to determining that the notification suggestion code suggests modifying the notification may include determining one or more notification suggestions based on the notification suggestion code, determining a best fit of the one or more notification suggestions and one or more notification settings on the wireless device, modifying the notification based on the determined best fit of the one or more notification suggestions and the one or more notification settings on the wireless device, and generating the modified notification. Such embodiments may include determining whether to modify the notification based on the determined best fit of the one or more notification suggestions in the one or more notification settings on the wireless device, and determining one or more modifications to make to the notification based on the determined best fit in response to determining to modify the notification. In some embodiments, the notification suggestion code may include an annunciation priority, and modifying the notification of the incoming communication may include generating a notification based on a user setting of the wireless device appropriate for the annunciation priority.

Various embodiments may include displaying, by a processor of a sender wireless device, notification suggestion options, receiving, by the processor, an input selecting one or more of the notification suggestion options, generating, by the processor, a notification suggestion code based on the selected one or more notification suggestion options, sending, by the processor, a communication to a receiver wireless device, and sending, by the processor, the notification suggestion code to enable the receiver wireless device to determine whether to modify a notification of the communication on the receiver wireless device based on the notification suggestion code.

In some embodiments, generating the notification suggestion code may include generating a notification suggestion code that includes an indication of whether the receiver wireless device should mute the notification of the incoming communication. In some embodiments, generating the notification suggestion code may include generating one or more suggested options that the receiver wireless device may determine to use for modifying the notification of the incoming communication. In some embodiments, generating the notification suggestion code may include embedding the notification suggestion code within the communication, and sending the notification suggestion code may include sending the communication with the embedded notification suggestion code. In some embodiments, receiving an input selecting one or more of the notification suggestion options may include receiving an input selecting an annunciation priority.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
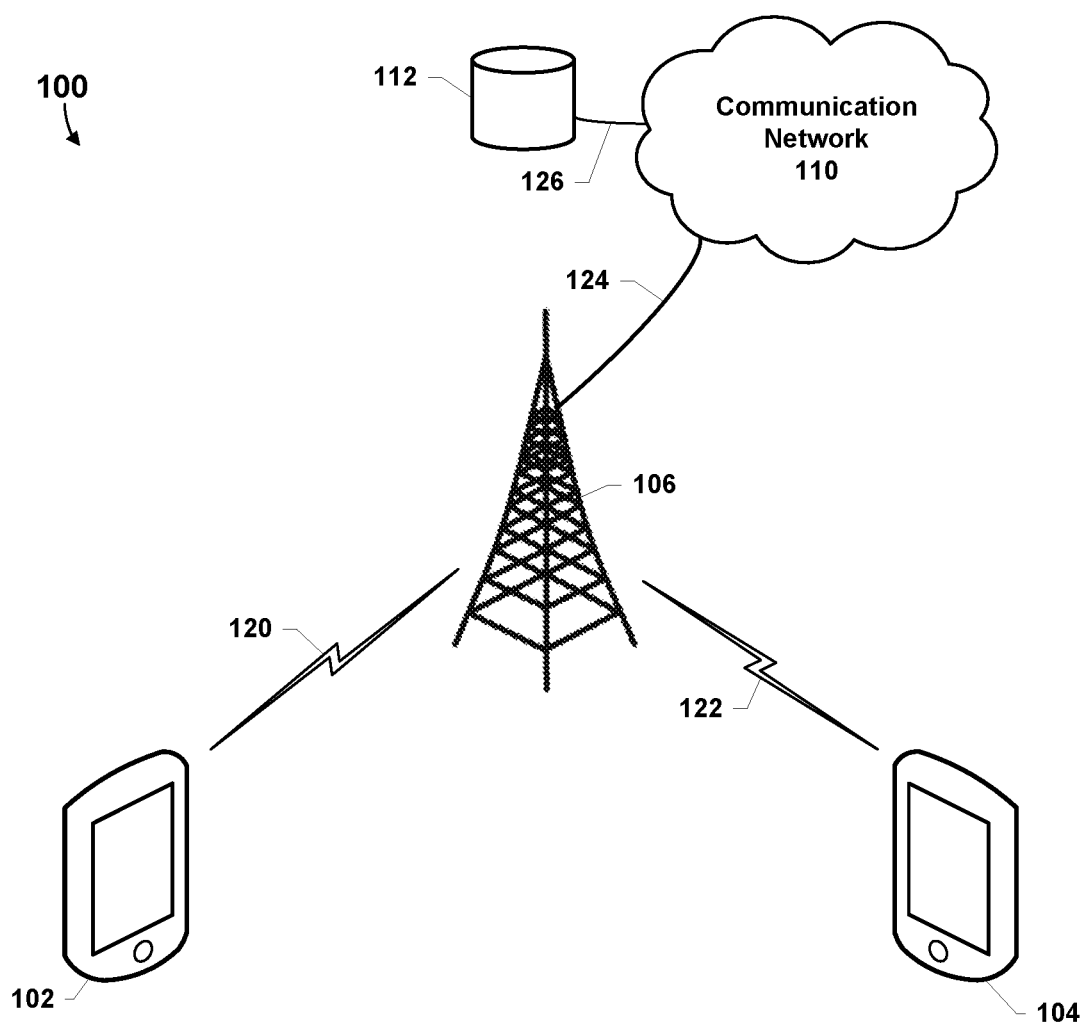
FIG. 1 is a system block diagram conceptually illustrating an example communications system in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, wireless devices and communication systems that enable a sender of a text, voice mail message or telephone call to indicate to the recipient wireless device that the text, message or call need not be announced depending on the local settings of the recipient wireless device. Various embodiments may include information in or along with the text, message or call that enables the recipient wireless device to determine whether a notification should be muted consistent with the sender's intention to avoid disturbing the recipient.

The term "wireless device" is used herein to refer to any one or all of wireless router devices, wireless appliances, cellular telephones, smartphones, portable computing devices, personal or mobile multi-media players, laptop computers, tablet computers, smartbooks, palmtop computers, wireless electronic mail receivers, multimedia Internet-enabled cellular telephones, wireless gaming controllers, wireless-network enabled Internet of Things (IoT) devices including large and small machinery and appliances for home or enterprise use, wireless communication elements within autonomous and semiautonomous vehicles, wireless devices affixed to or incorporated into various mobile platforms, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

Wireless communication systems are widely deployed to provide a variety of communication and information services. Wireless devices are capable of providing nearly ubiquitous access to communication services including voice, email, text messaging, and the like. Most wireless devices are configured to provide a visual, audible, tactile or other similar notification of an incoming or available call request, email, or text message. While sometimes useful, a notification may also be intrusive and disruptive, either for the user or for people nearby. While wireless devices can be turned off or all audio settings set to "silent" or "mute," this may cause a user to miss important messages or calls.

In situations, a user of the sender wireless device may wish to send a communication to a user of receiver wireless device, but desire that the communication not be intrusive or disturbing. The sender may know of circumstances or activities of the recipient in which a normal communication annunciation would be disturbing, disruptive, or otherwise not appreciated, but not know whether the recipient is actually engaged in such circumstances or activities. As an example, a patient may wish to send a communication to a doctor but not bother the doctor with a loud text annunciation if he or she is attending to other patients. As another example, a student may wish to send a text message to a professor but is worried about the text being disruptive if the professor is teaching a class. As another, a worker may wish to text a coworker but wants to ensure the text annunciation does not interrupt a meeting. As another example, a person may wish to send a text to a friend who has young children but is concerned about disrupting bedtime preparations. Various embodiments may enable a sender wireless device to generate and send communications that include a notification suggestion code that the receiver wireless device can interpret as indicating that an otherwise obtrusive or disturbing notification/annunciation for the received communication may be modified so as to be unobtrusive or not disturbing.

Various embodiments include wireless devices configured to perform methods of enabling a sender of a communication to suggest or influence the presentation or mode of user notification or annunciation generated by a receiving wireless device in response to the incoming communication. In various embodiments, a sender wireless device may send a communication to a receiver wireless device, such as a voice call request, a short message or other similar message (e.g., a "text message"), an email or another similar application-layer carried message, and include somewhere in the message a notification suggestion code indicating to the receiver wireless device how the communication may be announced to a user or how an annunciation setting may be implemented or modified for the communication. In various embodiments, the notification suggestion code does not constitute a command or an instruction from the sender wireless device, or from a network element (e.g., a server) to be executed by the receiver wireless device, but rather one or more suggested modifications to the message notification or announcement that the receiver wireless device may implement when informing the user of the receiver wireless device about the incoming communication.

In some embodiments, the notification suggestion code may be or include a simple indication such as a bit, a "flag," a short data element or information element, or other code that the receiver wireless device recognizes as suggesting that an audible notification of the incoming communication need not be generated. In response to receiving such a notification suggestion code, the receiver wireless device may mute, silence, suppress, or refrain from generating a notification that otherwise would be generated in response to receiving the communication. In some embodiments, the notification suggestion code may suggest that the receiver wireless device produce no notification (e.g., "mute notification" or "don't announce"), or another similar suggestion.

In some embodiments, the notification suggestion code may include one or more notification options suggesting one or more notification modifications to the receiver wireless device. For example, the notification options may include muting a speaker device of the receiver wireless device, overriding a default sound and playing a quieter sound, or no sound at all, suggesting a "silent" mode of operation in connection with the communication, suggesting a "vibrate only" mode of operation connection with the communication, suggesting a visible notification only, or another suitable suggestion. In some embodiments, the notification options may include a suggested visible notification color and/or pattern (e.g., using a display, a light emitting diode (LED), or another visible device of the receiver wireless device), a vibration pattern (e.g., that may be provided by a vibration motor, haptic feedback motor, or the like), or another suitable non-audio notification.

In some embodiments, the notification suggestion code may include an indication of an annunciation priority. In some embodiments the annunciation priority may be represented in any number of ways, such as alphanumerically (e.g., 1 representing a low priority, 10 representing a high priority, and so forth), by a code indicating "low," "medium," or "high," priority, or another suitable priority indication. This annunciation priority may be used by the receiver wireless device to determine the type of notification or announcement to generate in response to the incoming communication based upon annunciation settings or modes (e.g., silent, theater, normal, etc.) set by a user, but not presented to the user as an indication of the importance of the communication. In some embodiments, a receiver wireless device may be configured to enable a user to define different annunciation mechanisms, ring tones and volume settings linked to different priority indications included the notification suggestion code. For example, such capability may permit a user adjust the settings on a receiving wireless device to use a silent-vibrate annunciation for annunciation priority values of 3 or less, a quite ring tone annunciation for annunciation priority values of 4-6, a loud ring tone annunciation for annunciation priority values of 7-9, and an annunciation that includes a different loud ring tone, a flashing display and vibration for an annunciation priority value of 10. By providing that capability in receiver wireless devices and including a notification suggestion code, a sender may indicate the annunciation priority level of annunciation that is desired for a given communication, while a user of the receiving wireless device may set the preferred annunciation for each priority level.

In some embodiments, the notification suggestion code may include one or more suggested notification options for the processor of the receiver wireless device to modify a notification generated in response to the received communication. In some embodiments, the processor of the receiver wireless device may determine one or more suggested notification options from the notification suggestion code, as well as one or more notification settings on the receiver wireless device. In some embodiments, the processor of the receiver wireless device may determine a best fit of the one or more suggested notification options to one or more notification settings that a user as set on the receiver wireless device. In some embodiments, based on the determined best fit, the processor may determine one or more notifications to generate, and generate the determined one or more notifications, such as display an announcement (i.e., present a visual notification), vibrate (i.e., generate a haptic announcement), generate a sound different from normal audible settings (i.e., generate a modified audible announcement), or generate combinations of such modified announcements.

In some embodiments, the receiver wireless device may receive the indication of the communication and may obtain the notification suggestion code. In some embodiments, the receiver wireless device may parse, analyze, examine, etc. the notification suggestion code, and determine whether the notification suggestion code suggests modifying a notification associated with the communication from the sender wireless device. In some embodiments, the receiver wireless device may determine whether, and to what extent, to modify the notification associated with the communication based on the notification suggestion code.

FIG. 1 illustrates an example communications system 100 in which various embodiments may be performed. The communications system 100 may include a heterogeneous network architecture that includes a communication network 110 and a variety of base stations that support wireless communications, such as base station 106. The communications system 100 may include wireless devices such as wireless devices 102 and 104. The base station 106 may communicate with the communication network 110 over a wired or wireless communication link 124. The wireless devices 102 and 104 may communicate with the base station 106 over respective wireless communication links 120 and 122. The communication network 110 may include one or more network elements 112, such as server devices 112 that may be configured to perform a variety of processes to facilitate communication across the communication network 110. Examples of server devices 112 may include one or more server devices included in a cellular network back-end communication system, including devices configured to facilitate voice communication, data communication, and the like, and one or more server devices configured to facilitate application-layer communication across the communication network 110, such as email, instant messaging, and other similar communication. The server devices 112 may communicate with the communication network 110 over a wired or wireless communication link 126.

The communication links 124 and 126 may include wired communication links that may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP). The communication links 120, 122, 124, and 126 may include wireless communication links that may employ a plurality of carrier signals, frequencies, or frequency bands, each of which may include a plurality of logical channels. Such wireless communication links may utilize one or more RATs. Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use tell sinology and examples associated with LTE technologies, various embodiments may be applicable to other wireless communications systems, such as new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data.

Beamforming may be supported and beam direction may be dynamically configured. Multiple Input Multiple Output (MIMO) transmissions with precoding may also be supported. MIMO configurations in the DL may support up to 8 transmit antennas with multi-layer DL transmissions up to 8 streams and up to 2 streams per wireless device. Multi-layer transmissions with up to 2 streams per wireless device may be supported. Aggregation of multiple cells may be supported with up to 8 serving cells. Alternatively, NR may support a different air interface, other than an OFDM-based air interface.

Figure 2:
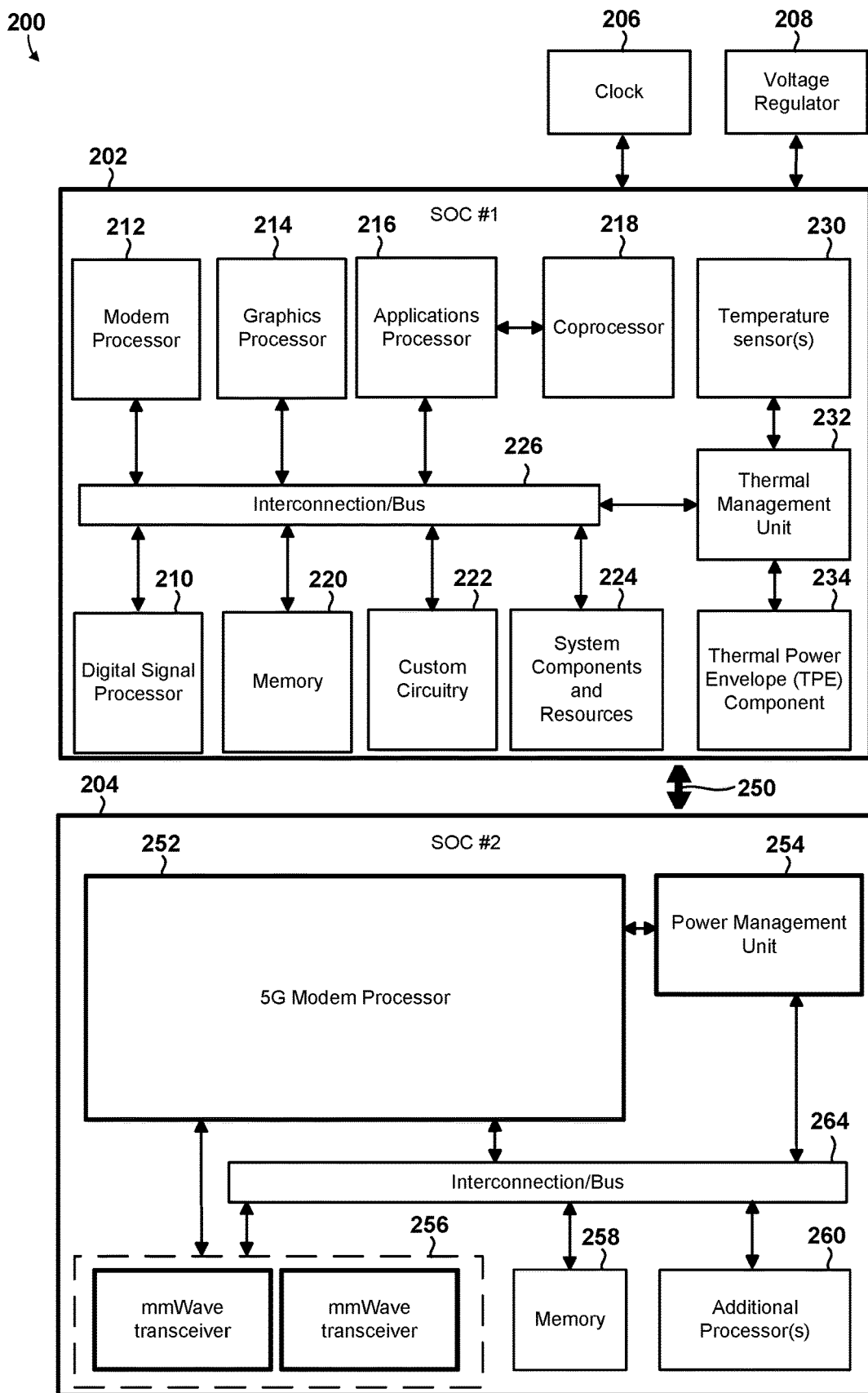
FIG. 2 is a component block diagram illustrating wireless communication device components suitable for implementing any of the various embodiments.

Various embodiments may be implemented on a number of single processor and multiprocessor computer systems, including a system-on-chip (SOC) or system in a package (SIP). FIG. 2 illustrates an example computing system or SIP 200 architecture that may be used in wireless devices implementing various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of a wireless device (e.g., the wireless devices 102 and 104) that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
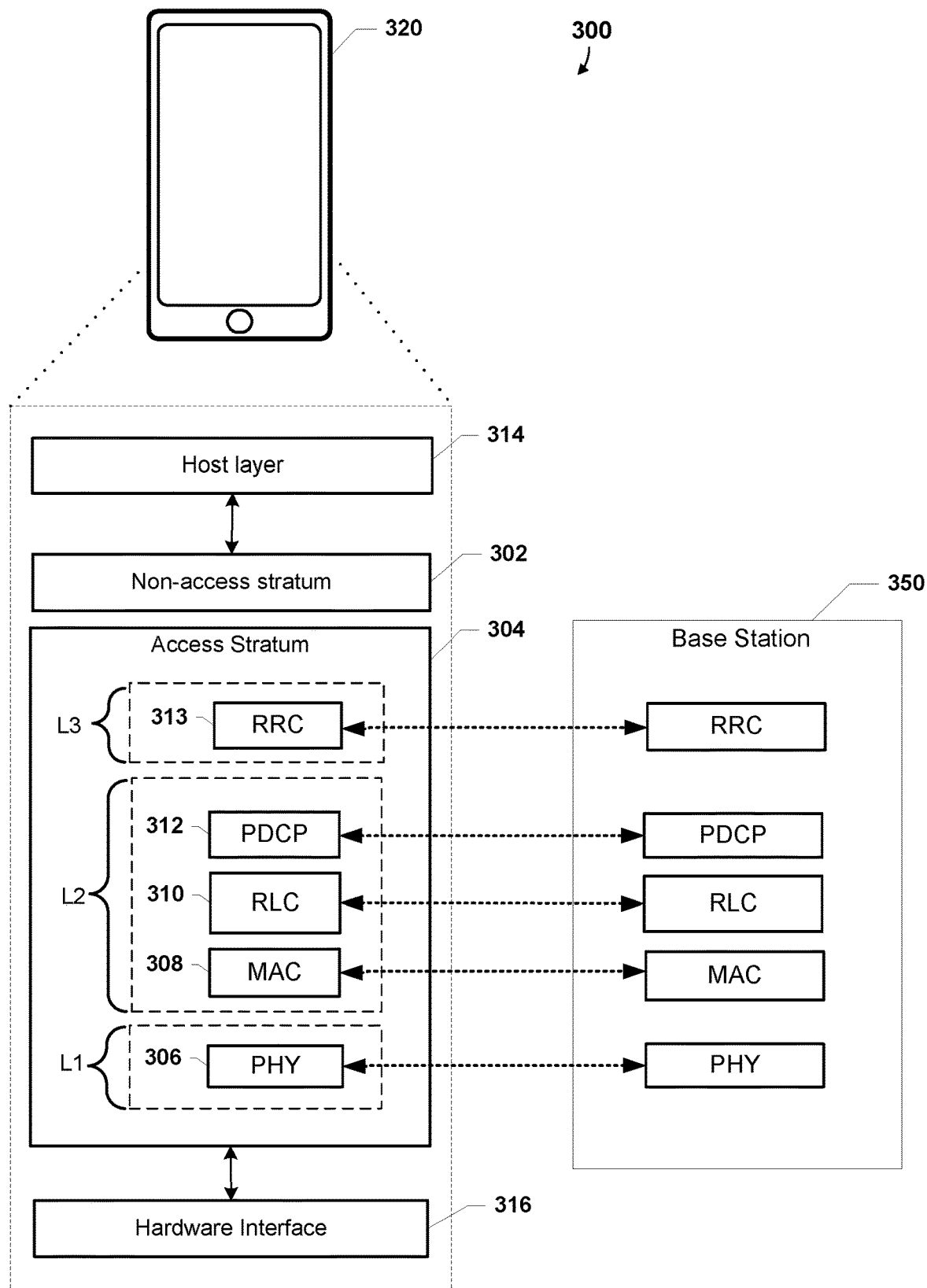
FIG. 3 is a diagram illustrating an example of a software architecture including a radio protocol stack for the user and control planes in wireless communications suitable for implementing any of the various embodiments.

FIG. 3 illustrates an example of a software architecture 300 including a radio protocol stack for the user and control planes in wireless communications between a base station 350 (e.g., the base station 106) and a wireless device 320 (e.g., the wireless devices 102, 104, 200). With reference to FIGS. 1-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-subscriber identity module (SIM) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the physical downlink control channel (PDCCH) and the physical downlink shared channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Re-transmissions of missing or erroneously received data units in an LTE wireless network are handled primarily by the HARQ mechanism in the MAC layer, complemented by the ARQ retransmission functionality of the RLC layer in LTE. This two-level retransmission structure is a result of the trade-off between fast and reliable feedback of the status reports. In particular, the HARQ mechanism provides very fast retransmission which may be suitable for high speeds used in LTE, whereas the ARQ is responsible for reliability. Usually HARQ handles the majority of transmission errors but sometimes the mechanism fails, in which case ARQ may be needed.

Specifically, HARQ feedback is fast and frequent to correct transmission errors as soon as possible. In this manner, the end-to-end round-trip time (RTT) for HARQ is low. The HARQ processes may involve a synchronous one-bit ACK/NACK signal that is sent every transmission attempt, the timing of which is used by the network to identify the corresponding data transmission. However, since the binary feedback at the HARQ level is susceptible to transmission errors, the additional ARQ protocol provides a reliable (but slower) feedback. Typically, ARQ processes involve asynchronous RLC status reports that contain explicit sequence numbers, which are protected by a cyclic redundancy check (CRC). Compared to HARQ, RLC status reports in ARQ processes are transmitted relatively infrequently and thus the cost of obtaining reliability is relatively small.

Figure 4:
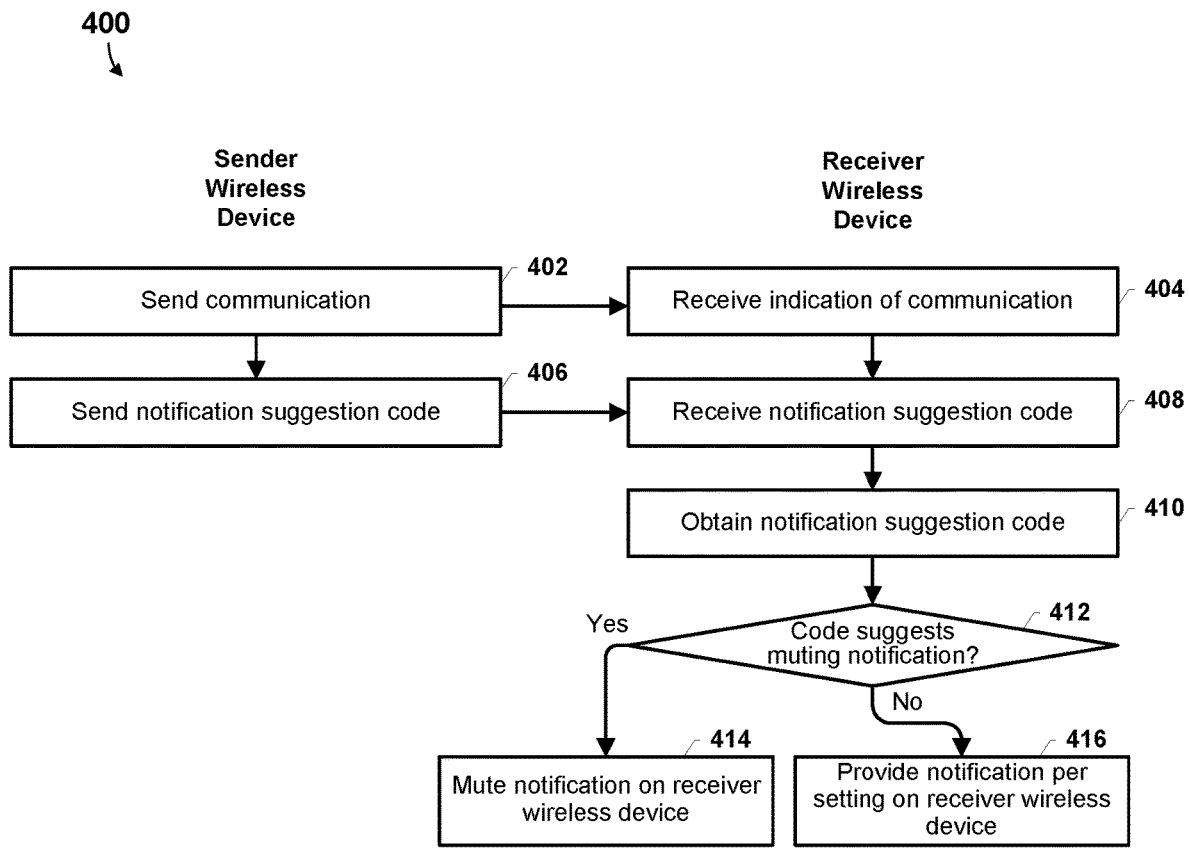
FIGS. 4-10 are process flow diagrams illustrating methods of managing a notification of an incoming communication on a wireless device in accordance with various embodiments.

FIG. 4 illustrates a method 400 of enabling a sending wireless device to influence the annunciation of a communication by a receiving wireless device according to various embodiments. With reference to FIGS. 1-4, the method 400 may be implemented in hardware components and/or software components of a wireless device (e.g., the wireless device 102, 104, 200, 320), the operation of which may be controlled by one or more processors (e.g., the processors 212, 214, 216, 218, 252, and 260) of the wireless device.

In block 402, the processor of a sender wireless device may send a communication to the receiver wireless device. For example, the processor of the sender wireless device may send a voice call request, a short message or other similar message, an email or another similar application-layer carried message, or another similar communication. In some embodiments, the indication of the communication from the sender wireless device may include a "message waiting indicator" or another similar indication of a message (e.g., a voicemail) that is available on a server device for retrieval by the receiver wireless device.

In block 404, the processor of the receiver wireless device may receive an indication of the communication. In some embodiments, the indication of the communication may include a call request message. In some embodiments, the indication of the communication may include a short message or similar message, an email or another similar application-layer carried message, or another similar communication. In some embodiments, the indication of the communication may include a message waiting indicator.

In block 406, the processor of the sender wireless device may send a notification suggestion code to the receiver wireless device. In some embodiments, the processor may generate a notification suggestion code related to the communication sent to the receiver wireless device based on an input by a user generating the communication. In some embodiments, the notification suggestion code may include a suggestion to the receiver wireless device to mute a notification of the indicated communication. In some embodiments, the notification may include a sound notification. In some embodiments, muting a notification may include silencing the notification, suppressing the notification, not generating the notification, refraining from playing or presenting using speaker device of the receiver wireless device, or another suitable action to prevent or refrain from presenting an audible notification related to the received indication of the communication. In some embodiments, the notification suggestion code may include an annunciation priority. In some embodiments, the notification suggestion code does not include a command to the receiver wireless device, but may include a processor-readable suggestion that the processor of the receiver wireless device may implement based on one or more determinations made by the processor of the wireless device.

In some embodiments, the processor of the sender wireless device may send the communication and the notification suggestion code in a single message, a single signal, or a combination thereof, such as part of a preamble or embedded within the indication of the communication (i.e., the operations in blocks 402 and 406 may be accomplished in one operation of sending the indication of the communication with an embedded notification suggestion code). In some embodiments, the processor of the sender wireless device may send the indication of the communication and the notification suggestion code in two or more separate messages and/or signals.

In block 408, the processor of the receiver wireless device may receive the notification suggestion code. The notification suggestion code may be associated with the indication of the communication. In embodiments in which the notification suggestion code is embedded within the indication of the communication, the processor of the receiver wireless device may receive the indication of the communication and the notification suggestion code in a single operation (i.e., the operations in blocks 404 and 408 may be accomplished in one operation of receiving the communication with an embedded notification suggestion code).

In block 410, the processor of the receiver wireless device may obtain the notification suggestion code. In some embodiments, the processor of the receiver wireless device may parse, analyze, examine, etc. the notification suggestion code.

In block 412, the processor of the receiver wireless device may determine whether the notification suggestion code suggests muting a notification associated with the communication from the sender wireless device. In some embodiments, the processor may determine whether the suggestion code is present, such as whether the suggestion code is present in a separate signal from the indication of the communication, included in the indication of the communication, or embedded in the indication of the communication.

In response to determining that the notification suggestion code suggests muting the notification (i.e., determination block 412="Yes"), the processor of the receiver wireless device may mute the notification on the receiver wireless device in block 414.

In response to determining that the notification suggestion code does not suggest muting the notification (i.e., determination block 412="No"), the processor of the receiver wireless device may provide a notification according to one or more settings on the receiver wireless device in block 416.

In some embodiments, the processor of the receiver wireless device may provide the notification according to the one or more settings on the receiver wireless device in response to determining that the notification code is not present.

Figure 5:
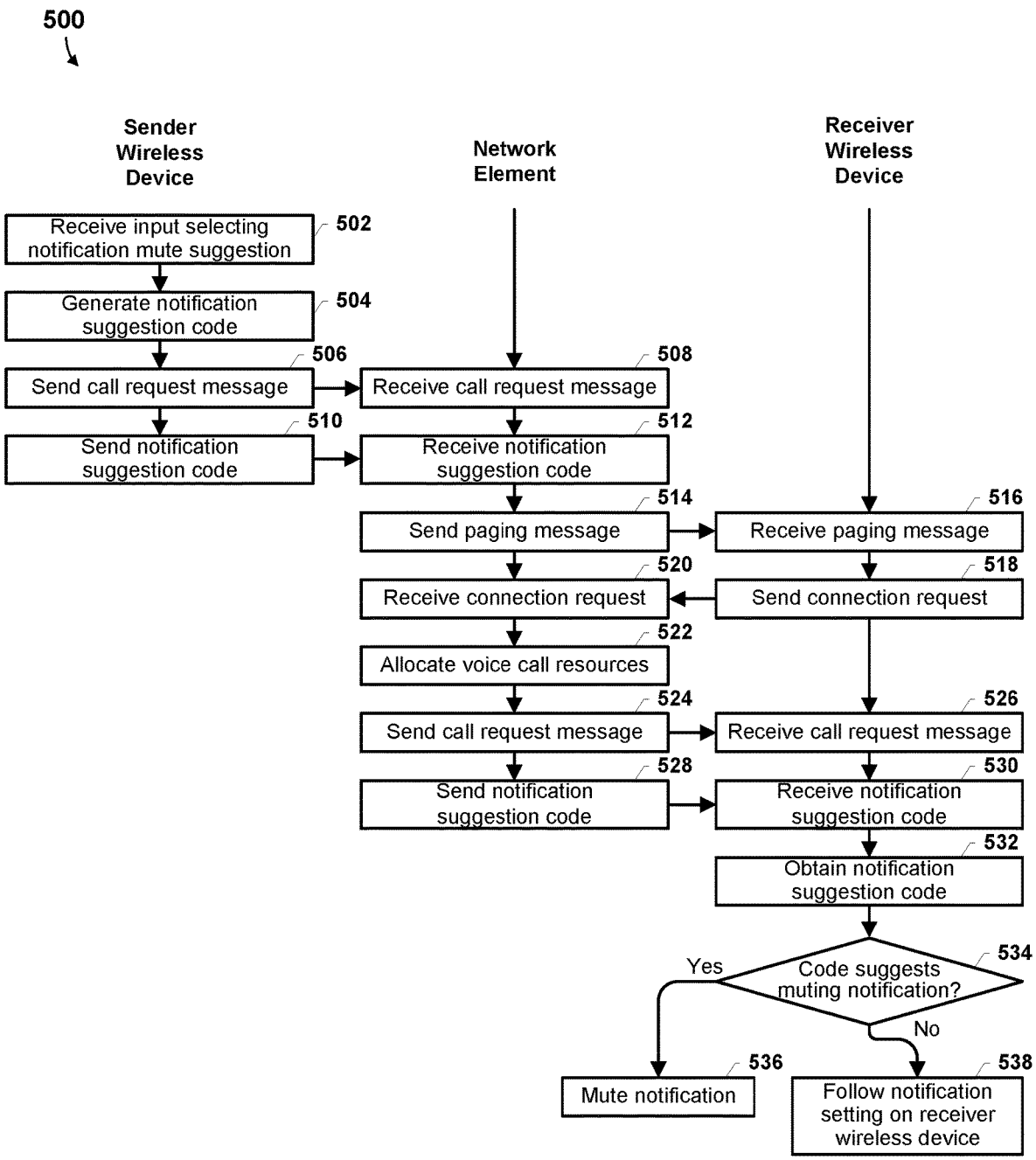

FIG. 5 illustrates a method 500 of enabling a sending wireless device to influence the annunciation of a communication by a receiving wireless device according to some embodiments. In some embodiments, the operations 500 may be implemented in connection with a voice communication service, such as cellular voice communications. With reference to FIGS. 1-5, the method 500 may be implemented in hardware components and/or software components of a wireless device (e.g., the wireless device 102, 104, 200, 320), the operation of which may be controlled by one or more processors (e.g., the processors 212, 214, 216, 218, 252, and 260) of the wireless device, and/or a network element 112, such as a call controller or another suitable server device or network element of a communication network (e.g., the communication network 110). In some embodiments, a plurality of network elements of the communication network may perform one or more operations of the method 500; however, for conciseness, the operations of the method 500 are described as performed by the processor of a network element, without limitation.

In block 502, the processor of the sender wireless device may receive an input selecting a notification mute suggestion. For example, the processor may receive an input at an input device such as a touchscreen, a button, a slider, etc. indicating the notification mute suggestion. In some embodiments, the processor may present a menu, list of options, user interface, or another similar presentation from which the notification mute suggestion may be selected. In some embodiments, the processor may enable the selection of the notification mute suggestion from within a phone application, a dialer application, or another similar application. In some embodiments, the processor may enable the selection of the notification mute suggestion as part of a lower application layer, for example, as part of an operating system of the sender wireless device.

In block 504, the processor of the sender wireless device may generate a notification suggestion code based on the selected notification mute suggestion.

In block 506, the processor of the sender wireless device may send a call request message to the network element of the communication network.

In block 508, a processor of the network element may receive the call request message.

In block 510, the processor of the sender wireless device may send the notification suggestion code to the network element.

In block 512, the processor of the network element may receive the notification suggestion code.

In block 514, the processor of the network element may send a paging message to the receiver wireless device. In various embodiments, the paging message may include a cellular paging message to instruct the receiver wireless device to request the setup of an active communication link with the communication network (e.g., a Radio Resource Control (RRC) Connection Request message or another similar message).

In block 516, the processor of the receiver wireless device may receive the paging message from the communication network.

In block 518, the processor the receiver wireless device may send a connection request message (e.g., an RRC Connection Request message or another similar message) to the communication network.

In block 520, the processor of the network element may receive the connection request message.

In block 522, the processor of the network element may allocate voice call resources for the requested network connection with the receiver wireless device.

In block 524, the processor of the network element may send a call request message to the receiver wireless device.

In block 526, the processor of the receiver wireless device may receive the call request message.

In block 528, the processor of the network element may send the notification suggestion code to the receiver wireless device. In some embodiments, the processor of the network element may send the call request message (block 524) and the notification suggestion code (block 528) in a single message, a single signal, or a combination thereof. In some embodiments, the processor of the network element may embed the notification suggestion code in a header portion of the call request message, such as in an information element or another portion of a message header. In some embodiments, the processor of the network element may embed the notification suggestion code in a content or payload portion of the call request message (i.e., the operations in blocks 524 and 528 may be accomplished in one operation of sending the call request message with an embedded notification suggestion code). In some embodiments, the processor the network element may include the notification suggestion code in metadata of the call request message or other information associated with, sent prior to, or sent after, the call request message. In some embodiments, the processor of the network element may send the call request message and the notification suggestion code in two or more separate messages and/or signals.

In block 530, the processor the receiver wireless device may receive the notification suggestion code. In embodiments in which the notification suggestion code is embedded within the call request message, the processor of the receiver wireless device may receive the call request message and the notification suggestion code in a single operation (i.e., the operations in blocks 526 and 530 may be accomplished in one operation of receiving the call request message with an embedded notification suggestion code).

In block 532, the processor of the receiver wireless device may obtain the notification suggestion code. In some embodiments, the processor of the receiver wireless device code may parse, analyze, examine, etc. one or more signal headers, messages, signals, and the like from the network element to obtain the notification suggestion code.

In determination block 534, the processor of the receiver wireless device may determine whether the notification suggestion code suggests muting a notification associated with the call request message.

In response to determining that the notification suggestion code suggests muting the notification (i.e., determination block 534="Yes"), the processor of the receiver wireless device may mute the notification on the receiver wireless device in block 536. In some embodiments, the processor of the wireless device may silence, or refrain from generating, a ring tone or other announcement of the received call request message. In some embodiments, the processor of the wireless device may temporarily invoke a "silent" mode of operations in which the processor refrains from presenting or suppresses notifications such as the ring tone.

In response to determining that the notification suggestion code does not suggest muting the notification (i.e., determination block 534="No"), the processor of the receiver wireless device may provide a notification (e.g., a ring tone) according to one or more notification settings on the receiver wireless device in block 538.

Figure 6:
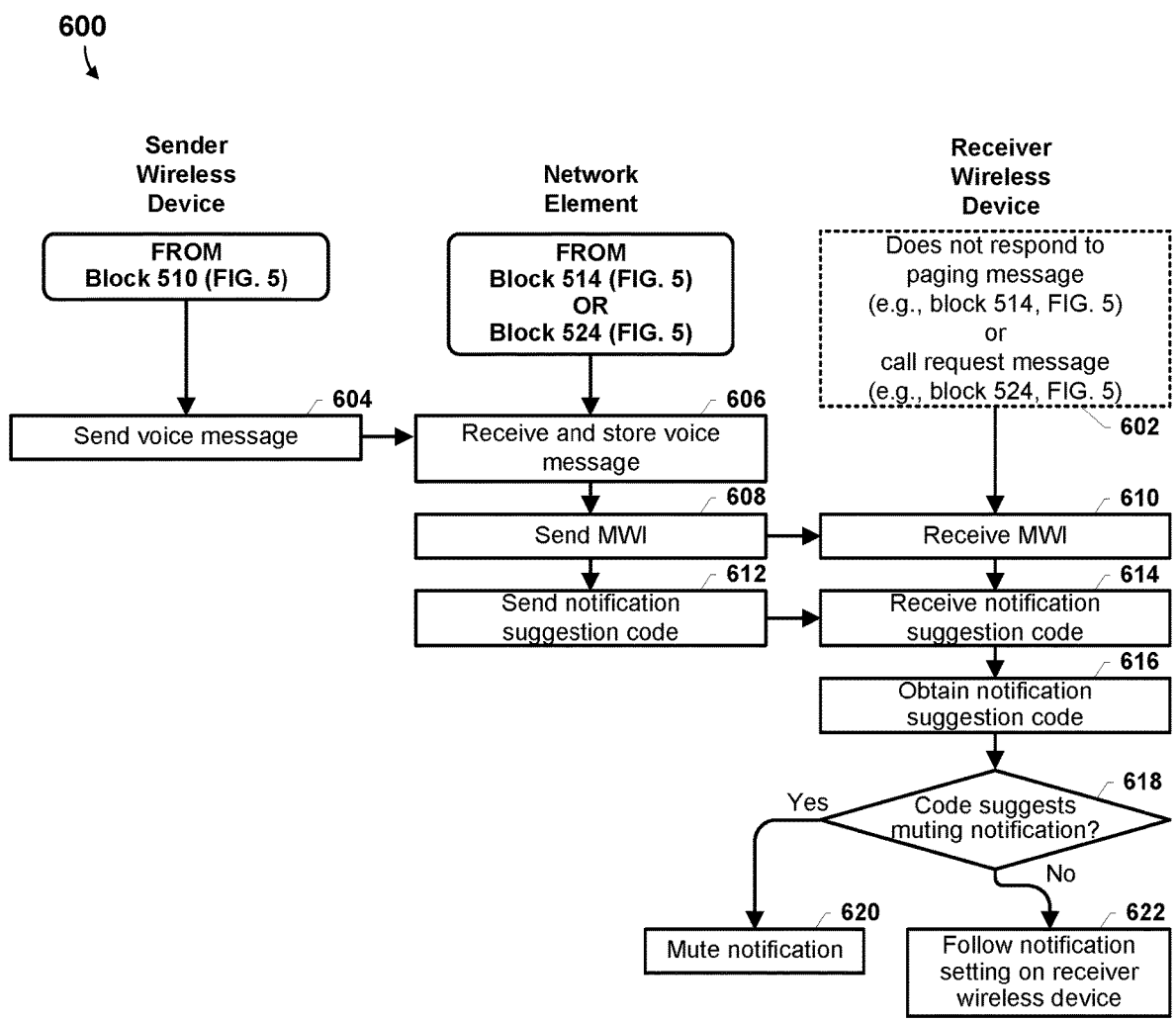

FIG. 6 illustrates a method 600 of enabling a sending wireless device to influence the annunciation of a communication by a receiving wireless device according to some embodiments. In some embodiments, the method 600 may be implemented in connection with a voice communication service, such as cellular voice communications. With reference to FIGS. 1-6, the method 600 may be implemented in hardware components and/or software components of a wireless device (e.g., the wireless device 102, 104, 200, 320), the operation of which may be controlled by one or more processors (e.g., the processors 212, 214, 216, 218, 252, and 260) of the wireless device, and/or a network element 112, such as a call controller or another suitable server device or network element of a communication network (e.g., the communication network 110). In some embodiments, a plurality of network elements of the communication network may perform one or more of the operations of the method 600; however, for conciseness, the operations of the method 500 are described as performed by the processor of a network element, without limitation. In blocks 502-526, the processors of the sender wireless device, network element, and receiver wireless device may perform operations of like-numbered blocks of the method 500 as described.

In block 602, in some embodiments, the receiver wireless device may not respond to a paging message (e.g., block 514, FIG. 5) or to a call request message (e.g., block 524, FIG. 5). For example, the receiver wireless device may be temporarily out of range of the communication network, or may be in a coverage hole, or may not answer a received call request. Typically in such scenarios, the network may provide the sender wireless device with an opportunity to record a voice message for the receiver wireless device.

In block 604, the processor of the sender wireless device may send a recorded voice message to the network element based on the selected notification mute suggestion.

In block 606, the processor of the network element may receive and store the voice message.

In block 608, the processor of the network element may send a message waiting indicator (MWI) to the receiver wireless device. In some embodiments, the MWI may indicate to the receiver wireless device that a voice message or another suitable message is available for retrieval from the communication network.

In block 610, the processor of the receiver wireless device may receive the MWI.

In block 612, the processor of the network element may send the notification suggestion code to the receiver wireless device. In some embodiments, the processor of the network element may send the MWI and the notification suggestion code in a single message, a single signal, or a combination thereof. In some embodiments, the processor of the network element may embed the notification suggestion code in a header portion of the MWI. In some embodiments, the processor of the network element may embed the notification suggestion code in a content or payload portion of the MWI (i.e., the operations in blocks 608 and 612 may be accomplished in one operation of sending the MWI with an embedded notification suggestion code). In some embodiments, the processor the network element may include the notification suggestion code in metadata of the MWI or other information associated with, sent prior to, or sent after, the MWI. In some embodiments, the processor of the network element may send the MWI and the notification suggestion code in two or more separate messages and/or signals.

In block 614, the processor of the receiver wireless device may receive the notification suggestion code. In embodiments in which the notification suggestion code is embedded within the MWI, the processor of the receiver wireless device may receive the MWI and the notification suggestion code in a single operation (i.e., the operations in blocks 610 and 614 may be accomplished in one operation of receiving the MWI with an embedded notification suggestion code).

In block 616, the processor of the receiver wireless device may obtain the notification suggestion code. In some embodiments, the processor of the receiver wireless device code may parse, analyze, examine, etc. one or more signal headers, messages, signals, and the like from the network element to obtain the notification suggestion code.

In determination block 618, the processor of the receiver wireless device may determine whether the notification suggestion code suggests muting a notification associated with the MWI.

In response to determining that the notification suggestion code suggests muting the notification (i.e., determination block 618="Yes"), the processor of the receiver wireless device may mute the notification on the receiver wireless device in block 620. In some embodiments, the processor of the wireless device may silence, or refrain from generating, a sound or other announcement of the MWI. In some embodiments, the processor of the wireless device may temporarily invoke a "silent" mode of operations in which the processor refrains from presenting or suppresses notifications such as the MWI announcement sound.

In response to determining that the notification suggestion code does not suggest muting the notification (i.e., determination block 618="No"), the processor of the receiver wireless device may provide a notification (e.g., a sound associated with the MWI) according to one or more notification settings on the receiver wireless device in block 622.

Figure 7:
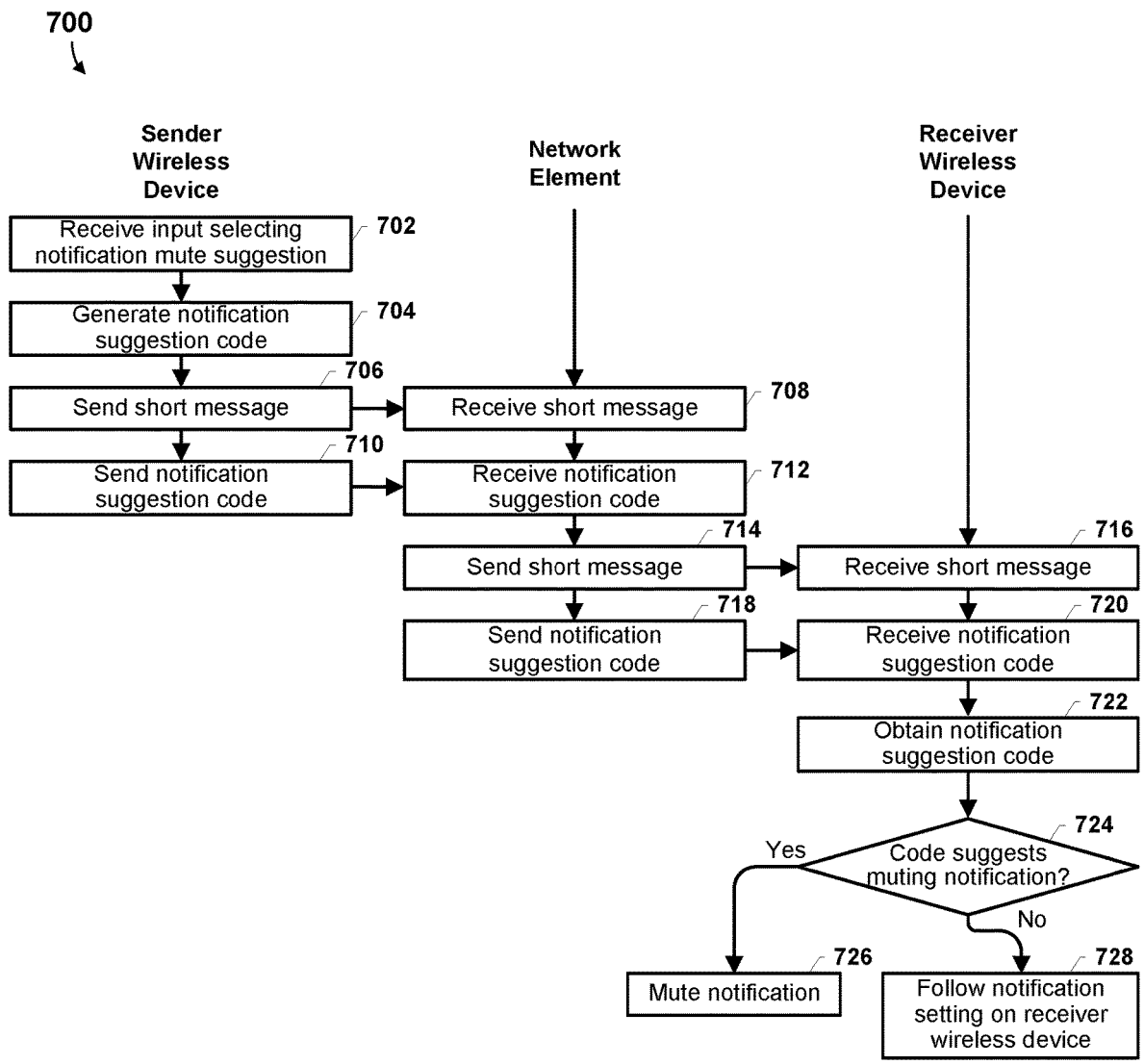

FIG. 7 illustrates a method 700 of enabling a sending wireless device to influence the annunciation of a communication by a receiving wireless device according to some embodiments. With reference to FIGS. 1-7, the method 700 may be implemented in hardware components and/or software components of a wireless device (e.g., the wireless device 102, 104, 200, 320), the operation of which may be controlled by one or more processors (e.g., the processors 212, 214, 216, 218, 252, and 260) of the wireless device, and/or a network element 112, such as a call controller or another suitable server device or network element of a communication network (e.g., the communication network 110). In some embodiments, a plurality of network elements of the communication network may perform one or more operations of the method 700; however, for conciseness, the operations of the method 700 are described as performed by the processor of a network element, without limitation.

In some embodiments, the operations 700 may be implemented in connection with a short message service, such as communications using a protocol such as Short Message Service (SMS), Short Message Peer-to-Peer (SMPP), Universal Computer Protocol (UCP), or another suitable protocol. For conciseness, a message using any of such protocols is referred herein as a "short message."

In block 702, the processor of the sender wireless device may receive an input selecting a notification mute suggestion. For example, the processor may receive an input at an input device such as a touchscreen, a button, a slider, etc. indicating the notification mute suggestion. In some embodiments, the processor may present a menu, list of options, user interface, or another similar presentation from which the notification mute suggestion may be selected. In some embodiments, the processor may receive an input identifying or selecting an annunciation priority for the communication. In some embodiments, the processor may enable the selection of the notification mute suggestion from within a short message application, an application that interfaces with or uses a portion of the short message application, or another similar application. In some embodiments, the processor may enable the selection of the notification mute suggestion as part of a lower application layer, for example, as part of an operating system of the sender wireless device.

In block 704, the processor of the sender wireless device may generate a notification suggestion code based on the selected notification mute suggestion.

In block 706, the processor of the sender wireless device may send a short message to the network element.

In block 708, a processor of the network element may receive the short message.

In block 710, the processor of the sender wireless device may send the notification suggestion code to the network element. In some embodiments, short message service operations may use control signaling such as SS7 (Signaling System No. 7) signaling. In some embodiments, the sender wireless device may send the notification suggestion code, for example, in one or more information elements (IEs) of control signaling such as a User Data Header (UDH) or similar control signaling included in a short message. However, encoding information in the UDH or other header information may use data space that otherwise is used for data payload (i.e., message content, in contrast to control signaling), the processor may send the notification suggestion code in a separate control signal, or in another separate signal.

In block 712, the processor of the network element may receive the notification suggestion code.

In block 714, the processor of the network element may send the short message to the receiver wireless device.

In block 716, the processor of the receiver wireless device may receive the short message.

In block 718, the processor of the network element may send the notification suggestion code to the receiver wireless device.

In some embodiments, the processor of the network element may send the short message (block 714) and the notification suggestion code (block 718) in a single message, a single signal, or a combination thereof. In some embodiments, the processor of the network element may embed the notification suggestion code in a header portion of the short message, such as in an information element or another portion of a short message header. In some embodiments, the processor of the network element may embed the notification suggestion code in the content or payload of the short message (i.e., the operations in blocks 714 and 718 may be accomplished in one operation of sending the short message with an embedded notification suggestion code). In some embodiments, the processor of the network element may send the short message and the notification suggestion code in two or more separate messages and/or signals.

In block 720, the processor of the receiver wireless device may receive the notification suggestion code. In embodiments in which the notification suggestion code is embedded within the short message, the processor of the receiver wireless device may receive the short message and the notification suggestion code in a single operation (i.e., the operations in blocks 716 and 720 may be accomplished in one operation of receiving the short message with an embedded notification suggestion code).

In block 722, the processor of the receiver wireless device may obtain the notification suggestion code. In some embodiments, the processor of the receiver wireless device code may parse, analyze, examine, etc. one or more message headers, messages, signals, and the like from the network element to obtain the notification suggestion code.

In determination block 724, the processor of the receiver wireless device may determine whether the notification suggestion code suggests muting a notification associated with the short message.

In response to determining that the notification suggestion code suggests muting the notification (i.e., determination block 724="Yes"), the processor of the receiver wireless device may mute the notification on the receiver wireless device in block 726. In some embodiments, the processor of the wireless device may silence, or refrain from generating, a notification sound or other announcement of the received short message. In some embodiments, the processor of the wireless device may temporarily invoke a "silent" mode of operations in which the processor refrains from presenting or suppresses notifications such as the notification sound.

In response to determining that the notification suggestion code does not suggest muting the notification (i.e., determination block 726="No"), the processor of the receiver wireless device may provide a notification (e.g., a notification sound) according to one or more notification settings on the receiver wireless device in block 728.

Figure 8:
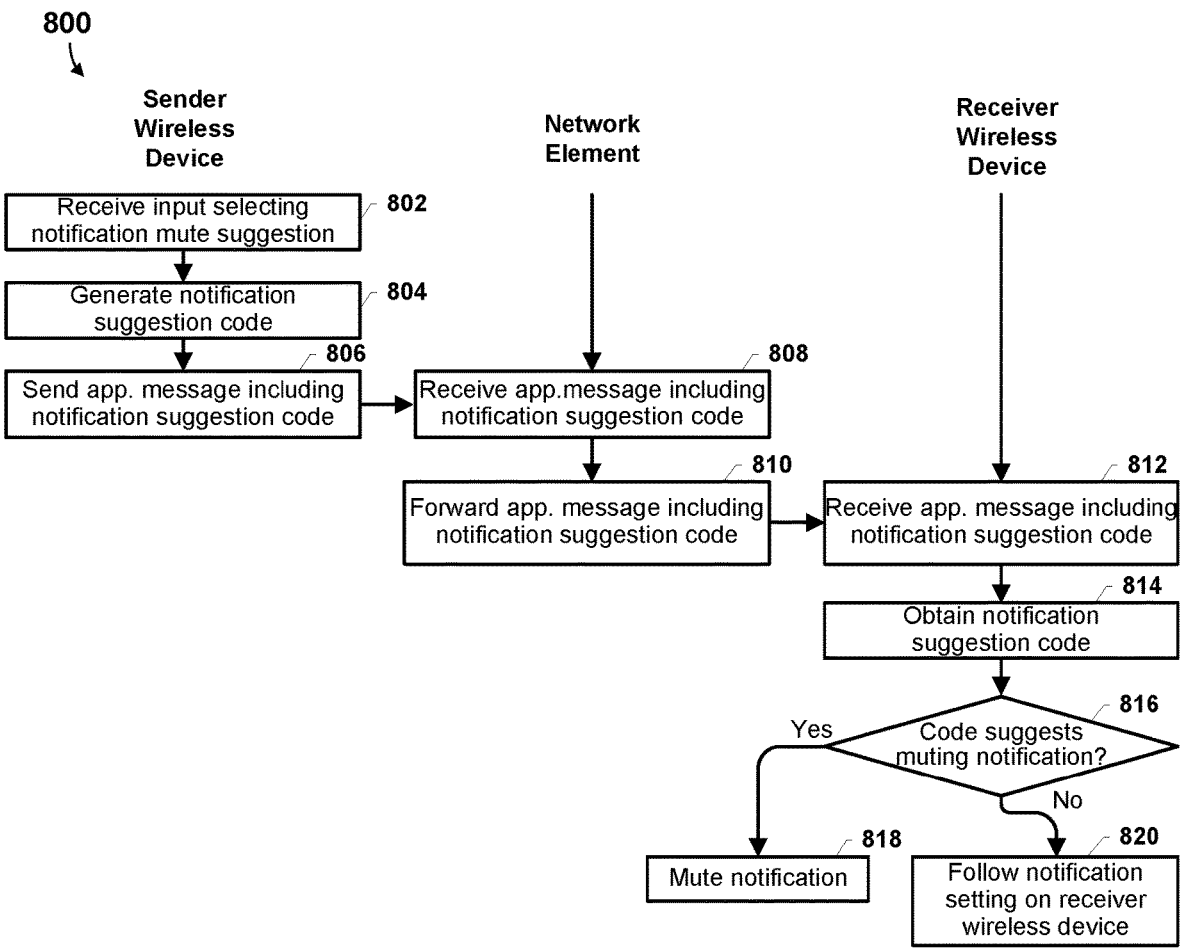

FIG. 8 illustrates a method 800 of enabling a sending wireless device to influence the annunciation of a communication by a receiving wireless device according to some embodiments. With reference to FIGS. 1-8, the method 800 may be implemented in hardware components and/or software components of a wireless device (e.g., the wireless device 102, 104, 200, 320), the operation of which may be controlled by one or more processors (e.g., the processors 212, 214, 216, 218, 252, and 260) of the wireless device, and/or a network element 112, such as a call controller or another suitable server device or network element of a communication network (e.g., the communication network 110). In some embodiments, a plurality of network elements of the communication network may perform one or more operations of the method 800; however, for conciseness, the operations of the method 800 are described as performed by the processor of a network element, without limitation.

In some embodiments, the operations 800 may be implemented in connection with an application messaging service, such as email, in-application messaging, in-service messaging, or another similar application messaging system. Examples of application messaging services include email, in-application messaging such as "instant messaging" systems (e.g., Blackberry Messenger, AOL Instant Messenger, ICQ, Telegram, Signal, WhatsApp, iMessage, and the like), and in-service messaging systems provided in a media application or service (e.g., messaging functions provided within Facebook, Twitter, Pinterest, Instagram, Zoom, and the like). Application messaging may include various content, including text, images, video, or other content. In various embodiments, such messaging systems may use communication and/or transport protocols such as Internet Message Access Protocol (IMAP), Post Office Protocol version 3 (POP3), Simple Mail Transfer Protocol (SMTP), Extensible Messaging and Presence Protocol (XMPP), Internet Relay Chat (IRC), Signal, or a proprietary communication and/or transfer protocol such as Apple Push Notification service (APNs), Handover Protocol, or another suitable protocol. For conciseness, a message using any of such protocols is referred to herein as an "application message."

In block 802, the processor of the sender wireless device may receive an input selecting a notification mute suggestion. For example, the processor may receive an input at an input device such as a touchscreen, a button, a slider, etc. indicating the notification mute suggestion. In some embodiments, the processor may present a menu, list of options, user interface, or another similar presentation from which the notification mute suggestion may be selected. In some embodiments, the input may select or enter an annunciation priority for the communication. In some embodiments, the processor may enable the selection of the notification mute suggestion from within an application or service, an application that interfaces with or uses a portion of the application or service, or another similar function. In some embodiments, the processor may enable the selection of the notification mute suggestion as part of a lower application layer, for example, as part of an operating system of the sender wireless device.

In block 804, the processor of the sender wireless device may generate a notification suggestion code based on the selected notification mute suggestion.

In block 806, the processor of the sender wireless device may send an application message to the network element. In some embodiments, the processor of the sender wireless device may configure the application message to include the notification suggestion code. In some embodiments, the sender wireless device may embed the notification suggestion code in a header portion of the application message. In some embodiments, the sender wireless device may embed the notification suggestion code in a content or payload portion of the application message. In some embodiments the sender wireless device may include the notification suggestion code in metadata associated with the application message.

In block 808, a processor of the network element may receive the application message including the notification suggestion code.

In block 810, the processor of the network element may forward the application message including the notification suggestion code to the receiver wireless device.

In block 812, the processor of the receiver wireless device may receive the application message including the notification suggestion code.

In block 814, the processor of the receiver wireless device may obtain the notification suggestion code. In some embodiments, the processor of the receiver wireless device code may parse, analyze, examine, etc. one or more application message headers, metadata associated with the application message, or other messages or signals, and the like from the network element to obtain the notification suggestion code.

In determination block 816, the processor of the receiver wireless device may determine whether the notification suggestion code suggests muting a notification associated with the application message.

In response to determining that the notification suggestion code suggests muting the notification (i.e., determination block 816="Yes"), the processor of the receiver wireless device may mute the notification on the receiver wireless device in block 818. In some embodiments, the processor of the wireless device may silence, or refrain from generating, a notification sound or other announcement of the received application message. In some embodiments, the processor of the wireless device may temporarily invoke a "silent" mode of operations in which the processor refrains from presenting or suppresses notifications such as the notification sound.

In response to determining that the notification suggestion code does not suggest muting the notification (i.e., determination block 816="No"), the processor of the receiver wireless device may provide a notification (e.g., a notification sound) according to one or more notification settings on the receiver wireless device in block 820.

Figure 9:
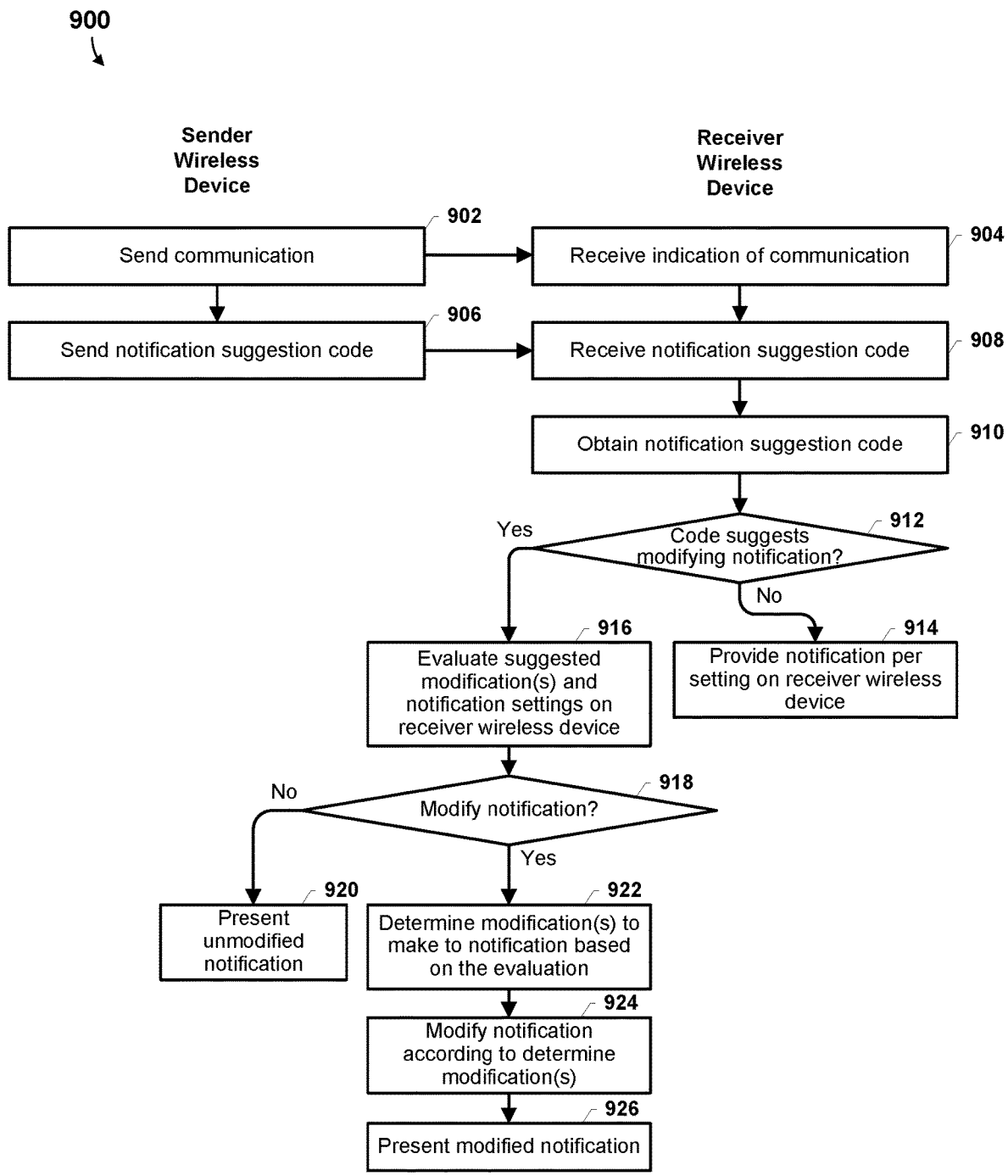

FIG. 9 illustrates a method 900 of enabling a sending wireless device to influence the annunciation of a communication by a receiving wireless device according to some embodiments. With reference to FIGS. 1-9, the method 900 may be implemented in hardware components and/or software components of a wireless device (e.g., the wireless device 102, 104, 200, 320), the operation of which may be controlled by one or more processors (e.g., the processors 212, 214, 216, 218, 252, and 260) of the wireless device.

In block 902, the processor of a sender wireless device may send a communication to the receiver wireless device. For example, the processor of the sender wireless device may send a voice call request, a short message or other similar message, an email or another similar application-layer carried message, or another similar communication. In some embodiments, the indication of the communication from the sender wireless device may include an MWI or another similar indication of a message that is available on a server device for retrieval by the receiver wireless device.

In block 904, the processor of the receiver wireless device may receive the indication of the communication.

In block 906, the processor of the sender wireless device may send a notification suggestion code to the receiver wireless device. In some embodiments, the processor may generate a notification suggestion code related to the communication sent to the receiver wireless device. In some embodiments, the notification suggestion code may include one or more suggested modifications that a processor of the receiver wireless device may implement to a notification of the indicated communication. In some embodiments, the notification suggestion code may include an annunciation priority. In various embodiments, the notification suggestion code does not include a command to the receiver wireless device, but may include a processor-readable suggestion that the processor of the receiver wireless device may implement based on one or more determinations made by the processor of the wireless device.

In some embodiments, the processor of the sender wireless device may send the communication and the notification suggestion code in a single message, a single signal, or a combination thereof, such as embedded within or as part of a preamble or embedded within another portion of the communication (i.e., the operations in blocks 902 and 906 may be accomplished in one operation of sending the communication with an embedded notification suggestion code). In some embodiments, the processor of the sender wireless device may send the communication and the notification suggestion code in two or more separate messages and/or signals.

In block 908, the processor of the receiver wireless device may receive the notification suggestion code. In embodiments in which the notification suggestion code is embedded within or as part of a preamble or embedded within another portion of the communication, the processor of the receiver wireless device may receive the communication and the notification suggestion code in a single operation (i.e., the operations in blocks 904 and 908 may be accomplished in one operation of receiving the communication with an embedded notification suggestion code).

In block 910, the processor of the receiver wireless device may obtain the notification suggestion code. In some embodiments, the processor of the receiver wireless device may parse, analyze, examine, etc. the notification suggestion code to obtain one or more suggested modifications that the processor of the receiver wireless device may determine to use, implement, or perform.

In block 912, the processor of the receiver wireless device may determine whether the notification suggestion code suggests modifying a notification associated with the communication from the sender wireless device. In various embodiments, modifying a notification may include changing one or more aspects of the notification. Examples of changing an aspect of the notification include including silencing, muting, or refraining from presenting a sound notification, reducing a volume of the sound notification, and providing an alternative notification such as a visual notification, haptic notification, or another alternative notification. In some embodiments, the notification suggestion code may suggest one or more aspects of the presentation of the alternative notification. For example, the notification suggestion code may suggest a color, flashing pattern, or another aspect of a visual notification, such as may be displayed by an LED light or a display screen of the receiver wireless device. As another example, the notification suggestion code may suggest a pattern, intensity, rhythm, or another aspect of a haptic notification.

In response to determining that the notification suggestion code does not suggest muting the notification (i.e., determination block 912="No"), the processor of the receiver wireless device may provide a notification according to one or more settings on the receiver wireless device in block 914.

In response to determining that the notification suggestion code suggests muting the notification (i.e., determination block 912="Yes"), the processor of the receiver wireless device may evaluate the one or more suggested modifications and notification settings on the receiver wireless device in block 916.

In determination block 918, the processor of the receiver wireless device may determine whether to modify the notification based on the evaluation of the one or more suggested modifications and notification settings on the receiver wireless device.

In response to determining not to modify the notification (i.e., determination block 918="No"), processor of the receiver wireless device may present an unmodified notification in block 920.

In response to determining to modify the notification (i.e., determination block 918="Yes"), processor of the receiver wireless device may determine one or more modifications to make to the notification based on the evaluation in block 922.

In block 924, the processor of the receiver wireless device may modify the notification according to the determined modification(s).

In block 926, the processor of the receiver wireless device may present the modified notification.

Figure 10:
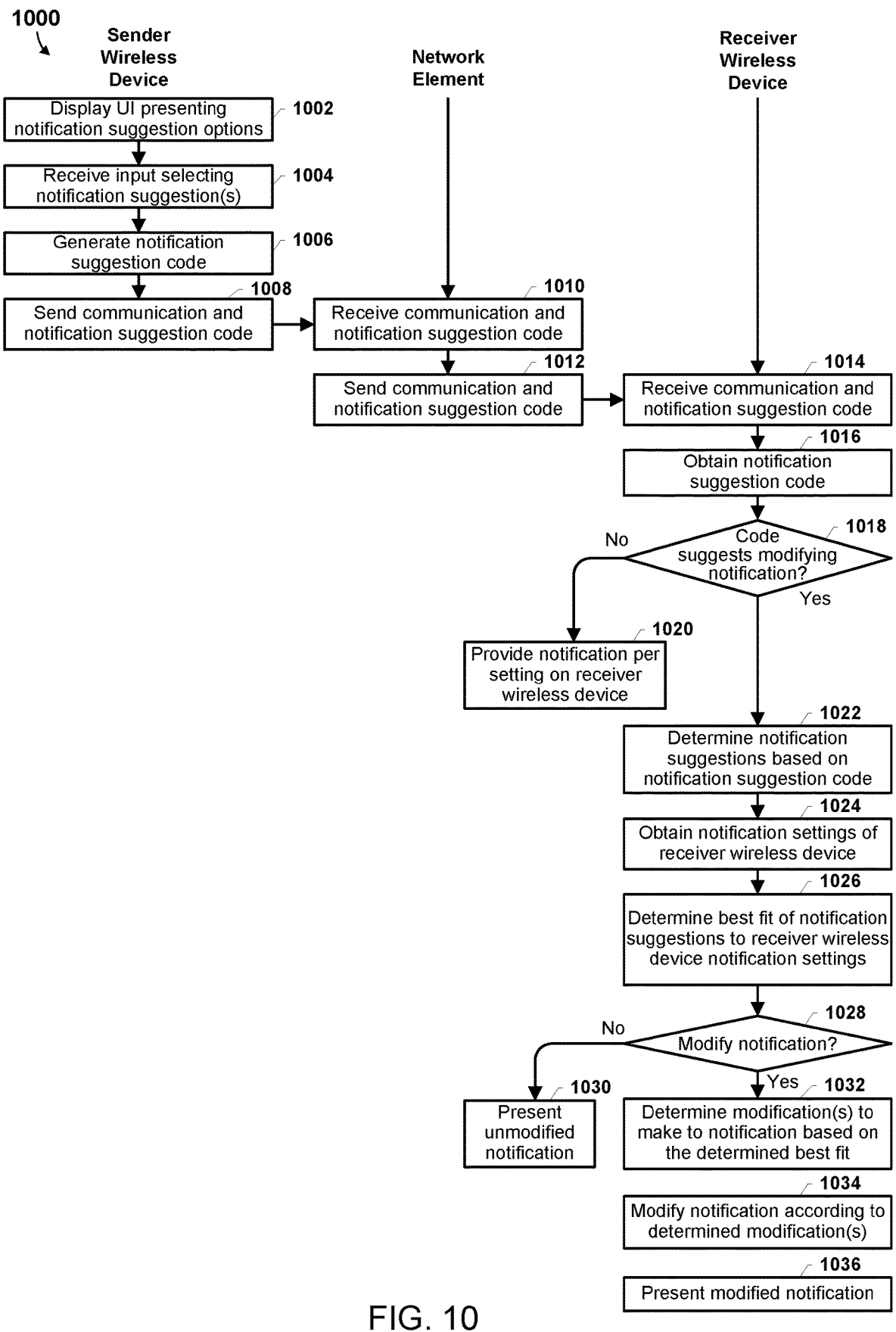

FIG. 10 illustrates a method 1000 of enabling a sending wireless device to influence the annunciation of a communication by a receiving wireless device according to some embodiments. With reference to FIGS. 1-10, the method 1000 may be implemented in hardware components and/or software components of a wireless device (e.g., the wireless device 102, 104, 200, 320), the operation of which may be controlled by one or more processors (e.g., the processors 212, 214, 216, 218, 252, and 260) of the wireless device, and/or a network element 112, such as a call controller or another suitable server device or network element of a communication network (e.g., the communication network 110). In some embodiments, a plurality of network elements of the communication network may perform one or more operations of the method 1000; however, for conciseness, the operations of the method 1000 are described as performed by the processor of a network element, without limitation.

In block 1002, the processor of the sender wireless device may display (e.g., on a display device of the sender wireless device) a user interface ("UI") presenting notification suggestion options. In some embodiments, the processor may enable the selection of the notification suggestion options from within a phone application, a dialer application, or another similar application. In some embodiments, the processor may enable the selection of the notification suggestion options as part of a lower application layer, for example, as part of an operating system of the sender wireless device.

In some embodiments, the notification suggestion options may include a menu, a list of options, etc. including choices for notification suggestions that the sender wireless device may send to the receiver wireless device, which the receiver wireless device may determine to perform to modify a notification that may be presented by the processor of the receiver wireless device. For example, the notification suggestion options may include suggestions that the receiver wireless device mute, silence, reduce the volume level of, etc. a speaker device of the receiver wireless device, override a default notification sound (e.g., select "none," "silence," or another suitable sound file selection), invoke a "silent" mode of operation, or "vibrate only" mode of operation. As another example, the notification suggestion options may include suggestions that the receiver wireless device display visible notification, as well as one or more parameters that the processor of the wireless device may use to configure of the visible notification's display. As another example, the notification suggestion options may include suggestions that the receiver wireless device provide a haptic notification or vibration, as well as one or more parameters that the processor of the wireless device may use to configure the haptic notification. As another example, the notification suggestion options may include an interface for selecting or specifying an annunciation priority for the communication. Other suggestion options are also possible.

In block 1004, the processor of the sender wireless device may receive an input selecting one or more notification suggestions from among the notification suggestion options. For example, the processor may receive an input at an input device such as a touchscreen, a button, a slider, etc. indicating the notification suggestions.

In block 1006, the processor of the sender wireless device may generate a notification suggestion code based on the one or more selected notification suggestions.

In block 1008, the processor of the sender wireless device may send a communication and the notification suggestion code to a network element of the communication network. In some embodiments, the processor may send the communication and the notification suggestion code together, separately, serially, or sequentially. In some embodiments, the processor may embed or include the notification suggestion code in a portion of the communication, e.g., in a header portion of the communication, and a payload portion (i.e., a content portion) of the communication that is distinct from the header portion, or another portion of the communication.

Examples of various communications are described with respect to the methods 400, 500, 600, 700, 800, and 900.

In some embodiments, the processor of the sender wireless device may display the user interface presenting the notification options before, during, or after the preparation of the communication, or the sending of the communication to the receiver wireless device. For example, the processor may display the notification options user interface (UI) as part of the sender wireless device settings, within or in connection to an application used for preparing the communication (e.g., an SMS application, an email application, and the like), or within or in connection to a phone dialer application. In some embodiments, the processor may display the notification options UI after receiving a and input initiating a "send message" or "send call request" command or similar command.

In block 1010, the processor of the network element may receive the communication and the notification suggestion code.

In block 1012, the processor of the network element may send the communication and the notification suggestion code to the receiver wireless device. In some embodiments, the processor may send the communication and the notification suggestion code together, separately, serially, or sequentially. In some embodiments, the notification suggestion code may be included or embedded in a portion of the communication, such as a header portion, or a content or payload portion.

In block 1014, the processor of the receiver wireless device may receive the communication and the notification suggestion code.

In block 1016, the receiver wireless device may obtain the notification suggestion code. In some embodiments, the processor of the receiver wireless device code may parse, analyze, examine, etc. one or more signal headers, messages, signals, and the like from the network element to obtain the notification suggestion code.

In block 1018, the processor of the receiver wireless device may determine whether the notification suggestion code suggests modifying a notification associated with the communication.

In response to determining that the notification suggestion code does not suggest muting the notification (i.e., determination block 1018="No"), the processor of the receiver wireless device may provide a notification (e.g., a ring tone) according to one or more notification settings on the receiver wireless device in block 1020.

In response to determining that the notification suggestion code suggests modifying the notification (i.e., determination block 1018="Yes"), the processor of the receiver wireless device may determine the one or more notification suggestions based on the notification suggestion code in block 1022.

In block 1024, the processor of the receiver wireless device may obtain the notification settings of the receiver wireless device. The notification settings of the receiver wireless device may include one or more parameters or instructions that are set on the wireless device for providing notifications of, among other things, incoming communications.

In block 1026, the processor of the receiver wireless device may determine a best fit of the one or more notification suggestions and the receiver wireless device notification settings. In some embodiments, the processor of the receiver wireless device may determine whether using or performing one or more of the notification suggestions to modify a notification conflicts with a notification setting on the receiver wireless device. In some embodiments, the processor may evaluate the one or more notification suggestions in view of the receiver wireless device notification settings, and may determine that one or more notification modifications are permitted by the receiver wireless device notification settings. In some embodiments, the processor may perform such evaluation and determine that one or more modification settings are not permitted by the receiver wireless device notification settings. For example, the receiver wireless device may be set to "always notify," "always play sound notifications," or another similar setting, in which case the processor may ignore or refrain from using or performing one or more notification suggestions for silencing or changing a sound notification. As another example, the receiver wireless device may be set to accept or perform notification suggestions (e.g., received from the sender wireless device), in which case the processor may use or perform one or more notification suggestions to modify a notification. In some embodiments, the processor may determine whether using or performing one or more of the notification suggestions is possible given the hardware and/or software available on the receiver wireless device.

In some embodiments, the notification suggestions may be in the form of an annunciation priority identified in the incoming communication and determining a best fit of notification suggestions to receiver wireless device notification settings may involve determining a notification based on a user setting of the receiver wireless device appropriate for the annunciation priority. For example, a user may adjust notifications settings on a receiving wireless device to use a silent-vibrate annunciation for annunciation priority values of 3 or less, a quite ring tone annunciation for annunciation priority values of 4-6, a loud ring tone annunciation for annunciation priority values of 7-9, and an annunciation that includes a different loud ring tone, a flashing display and vibration for an annunciation priority value of 10. In this manner, a user of a receiving wireless device may also control the manner in which incoming communication announcements are generated based upon the input of the sender (in an annunciation priority).

In determination block 1028, the processor of the wireless device may determine whether to modify a notification. In some embodiments, the processor may determine whether to modify the notification based on the determined best fit of the notification suggestions and the receiver wireless device notification settings.

In response to determining not to modify the notification (i.e., determination block 1028="No"), processor of the receiver wireless device may present an unmodified notification in block 1030.

In response to determining to modify the notification (i.e., determination block 1028="Yes"), processor of the receiver wireless device may determine one or more modifications to make to the notification based on the determined best fit in block 1032.

In some embodiments, the processor may modify the notification to mute, silence, reduce the volume level of, etc. a speaker device of the receiver wireless device. In some embodiments, the processor may modify the notification to override a notification sound setting on the receiver wireless device (e.g., select "none," "silence," or another suitable sound file selection). In some embodiments, the processor may modify the notification to invoke a "silent" mode of operation, or "vibrate only" mode of operation to prevent the presentation of a notification sound. In some embodiments, the processor may modify the notification to display a visible notification, for example, on a display screen or an LED light of the receiver wireless device. In some embodiments, the processor may use one or more parameters provided in the notification suggestions to configure the display of the visible notification, such as a color, pattern, flashing pattern or frequency, or another suitable notification display parameter. In some embodiments, the processor may modify the notification to present a haptic notification or vibration. In some embodiments, the processor may use one or more parameters provided in the notification suggestions to configure the haptic or vibration notification, such as a pattern of vibration, a frequency of vibration, an intensity of vibration, or another suitable notification vibration parameter. Other examples are also possible.

In block 1034, the processor of the receiver wireless device may modify the notification according to the determined modification(s).

In block 1036, the processor of the receiver wireless device may present the modified notification.

Figure 11:
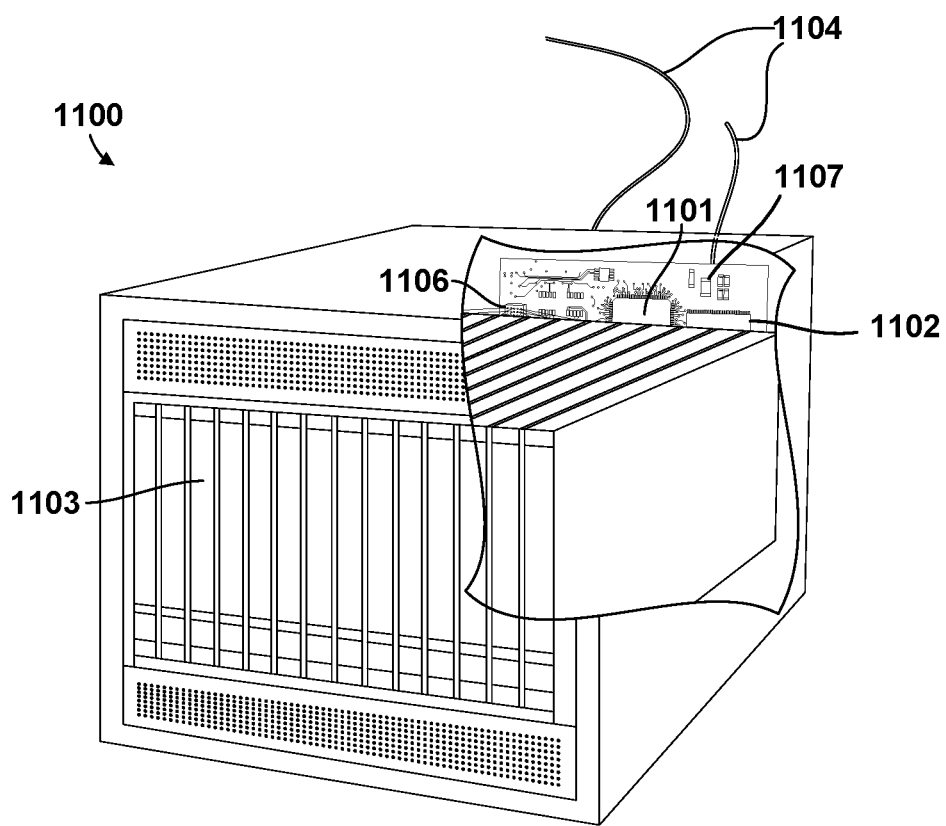
FIG. 11 is a component block diagram of a server device suitable for implementing any of the various embodiments.

Various embodiments may be implemented on a variety of wireless network devices, an example of which is illustrated in FIG. 11 in the form of a wireless network computing device 1100 functioning as a network element of a communication network. Such network computing devices may include at least the components illustrated in FIG. 11. With reference to FIGS. 1-11, the network computing device 1100 (e.g., the network element 112) may typically include a processor 1101 coupled to volatile memory 1102 and a large capacity nonvolatile memory, such as a disk drive 1103. The network computing device 1100 may also include a peripheral memory access device such as a floppy disc drive, compact disc (CD) or digital video disc (DVD) drive 1106 coupled to the processor 1101. The network computing device 1100 may also include network access ports 1104 (or interfaces) coupled to the processor 1101 for establishing data connections with a network, such as the Internet and/or a local area network coupled to other system computers and servers. The network computing device 1100 may include one or more antennas 1107 for sending and receiving electromagnetic radiation that may be connected to a wireless communication link. The network computing device 1100 may include additional access ports, such as USB, Firewire, Thunderbolt, and the like for coupling to peripherals, external memory, or other devices.

Figure 12:
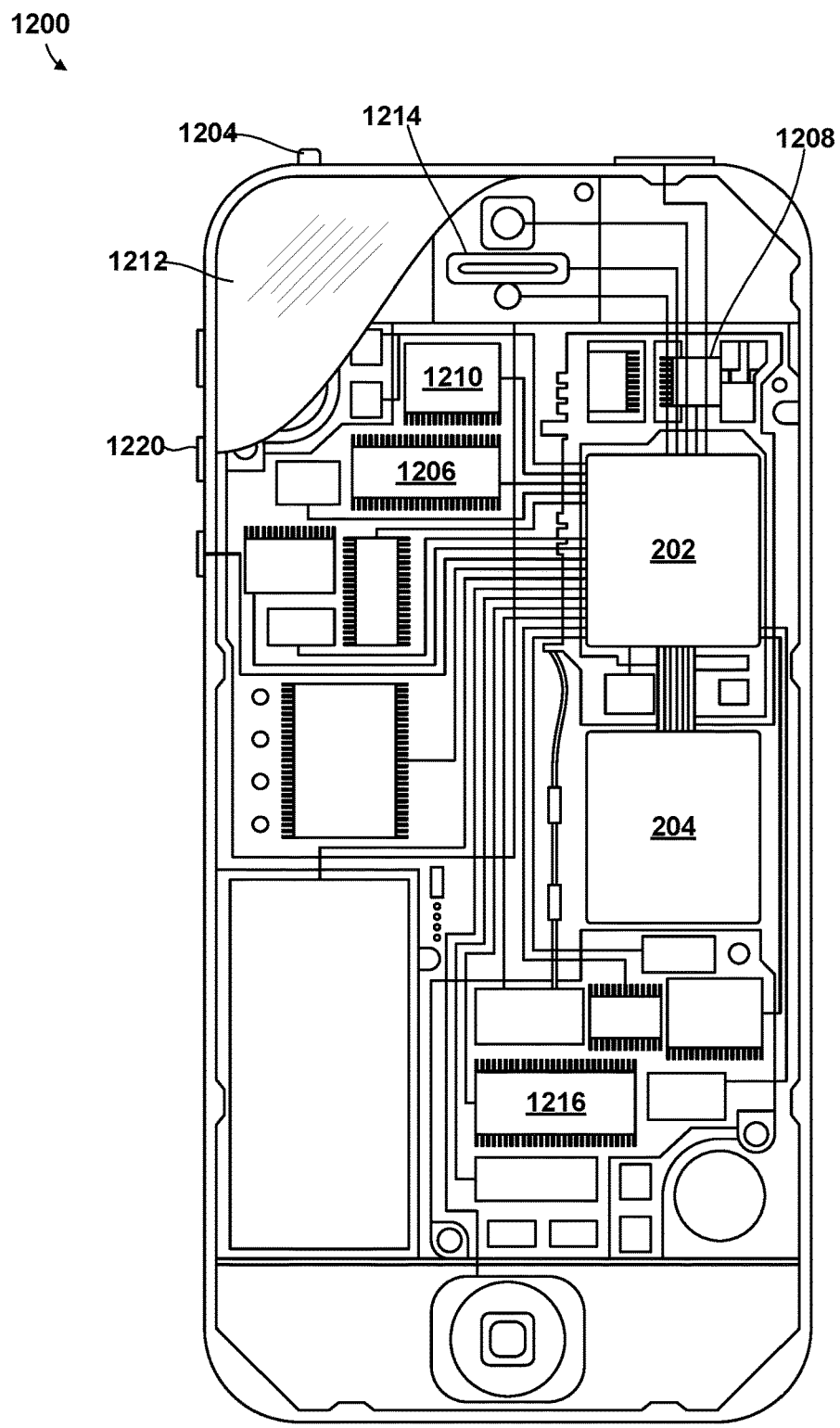
FIG. 12 is a component block diagram of a wireless communication device suitable for implementing any of the various embodiments.

Various embodiments may be implemented on a variety of wireless devices, an example of which is illustrated in FIG. 12 in the form of a smartphone 1200. With reference to FIGS. 1-12, the smartphone 1200 (e.g., the wireless device 102, 104, 200, 320) may include a first SOC 202 (e.g., a SOC-CPU) coupled to a second SOC 204 (e.g., a 5G capable SOC). The first and second SOCs 202, 204 may be coupled to internal memory 1206, 1216, a display 1212, and to a speaker 1214. Additionally, the smartphone 1200 may include an antenna 1204 for sending and receiving electromagnetic radiation that may be connected to a wireless data link and/or cellular telephone transceiver 1208 coupled to one or more processors in the first and/or second SOCs 202, 204. Smartphones 1200 typically also include menu selection buttons or rocker switches 1220 for receiving user inputs.

A typical smartphone 1200 also includes a sound encoding/decoding (CODEC) circuit 1210, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1208 and CODEC 1210 may include a digital signal processor (DSP) circuit (not shown separately).

The processors of the wireless network computing device 1100 and the smart phone 1200 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 1206, 1216 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400-1000 may be substituted for or combined with one or more operations of the methods 400-1000.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of managing a notification of an incoming communication on a receiver wireless device, comprising:
    receiving, by a processor of the receiver wireless device, an indication of an incoming communication;
    receiving, by the processor, a notification suggestion code associated with the indication of the incoming communication from a sender wireless device, wherein the notification suggestion code includes one or more suggested optional modifications configured to indicate to the processor one or more notification options for modifying a notification of the incoming communication;
    determining, by the processor, whether the received notification suggestion code suggests optionally modifying the notification of the incoming communication;
    evaluating, by the processor, whether to modify the notification based on one or more suggested optional modifications in the notification suggestion code that the receiver wireless device may determine to use for modifying the notification; and
    modifying, by the processor, the notification of the incoming communication using one or more of the suggested optional modifications in response to determining to modify the notification.

2. The method of claim 1, wherein the notification suggestion code comprises an indication of whether the receiver wireless device can optionally mute the notification of the incoming communication.

3. The method of claim 1, wherein modifying the notification of the incoming communication in response to determining to modify the notification comprises:
muting, by the processor, the notification of the incoming communication on the receiver wireless device.

4. The method of claim 1, wherein modifying the notification of the incoming communication in response to determining to modify the notification comprises:
modifying, by the processor, the notification to display visible notification.

5. The method of claim 1, wherein modifying the notification of the incoming communication in response to determining to modify the notification comprises:
modifying, by the processor, the notification to provide a haptic notification.

6. The method of claim 1, wherein modifying the notification of the incoming communication in response to determining to modify the notification comprises:
determining one or more notification suggestions based on the notification suggestion code;
determining an optimal selection of the one or more notification suggestions and one or more notification settings on the receiver wireless device;
modifying the notification based on the determined optimal selection of the one or more notification suggestions and the one or more notification settings on the receiver wireless device; and
generating the modified notification.

7. The method of claim 6, further comprising:
determining whether to modify the notification based on the determined optimal selection of the one or more notification suggestions in the one or more notification settings on the receiver wireless device; and
determining one or more modifications to make to the notification based on the determined optimal selection in response to determining to modify the notification.

8. The method of claim 1, wherein:
the notification suggestion code comprises an annunciation priority; and
modifying the notification of the incoming communication comprises generating a notification based on a user setting of the receiver wireless device appropriate for the annunciation priority.

9. A method of managing a notification of an incoming communication on a sender wireless device, comprising:
displaying, by a processor of the sender wireless device, notification suggestion options;
receiving, by the processor, an input selecting one or more of the notification suggestion options;
generating, by the processor, a notification suggestion code based on the selected one or more notification suggestion options, wherein the notification suggestion code comprises one or more suggested optional modifications configured to indicate to a receiver wireless device one or more notification options that the receiver wireless device may determine to use for optionally modifying a notification of an incoming communication;
sending, by the processor, a communication to the receiver wireless device; and
sending, by the processor, the notification suggestion code to the receiver wireless device in order to enable the receiver wireless device to evaluate whether to modify a notification of the communication on the receiver wireless device based on the one or more suggested optional modifications of the notification suggestion code.

10. The method of claim 9, wherein generating the notification suggestion code comprises generating a notification suggestion code that includes an indication of whether the receiver wireless device should mute the notification of the incoming communication.

11. The method of claim 9, wherein:
generating the notification suggestion code comprises embedding the notification suggestion code within the communication; and
sending the notification suggestion code comprises sending the communication with the embedded notification suggestion code.

12. The method of claim 9, wherein receiving an input selecting one or more of the notification suggestion options comprises receiving an input selecting an annunciation priority.

13. A receiver wireless device, comprising:
a processor configured with processor-executable instructions to:
receive an indication of an incoming communication;
receive a notification suggestion code associated with the indication of the incoming communication from a sender wireless device, wherein the notification suggestion code includes one or more suggested optional modifications configured to indicate to the processor one or more notification options for modifying a notification of the incoming communication;
determine whether the receiver notification suggestion code suggests optionally modifying the notification of the incoming communication on the receiver wireless device;
evaluate whether to modify the notification based on one or more suggested optional modifications in the notification suggestion code that the receiver wireless device may determine to use for modifying the notification; and
modify the notification of the incoming communication on the receiver wireless device using one or more of the suggested optional modifications in response to determining to modify the notification.

14. The receiver wireless device of claim 13, wherein:
the received notification suggestion code comprises an indication of whether the receiver wireless device can optionally mute the notification of the incoming communication; and
the processor is further configured with processor-executable instructions to modify the notification of the incoming communication on the receiver wireless device by muting the notification of the incoming communication in response to determining that the received notification suggestion code indicates muting the notification of the incoming communication.

15. The receiver wireless device of claim 13, wherein the processor is further configured with processor-executable instructions to use suggested optional modifications in the notification suggestion code to determine how to modify the notification of the incoming communication.

16. The receiver wireless device of claim 13, wherein the processor is further configured with processor-executable instructions to modify the notification of the incoming communication by muting the notification of the incoming communication on the wireless device.

17. The receiver wireless device of claim 13, wherein the processor is further configured with processor-executable instructions to modify the notification of the incoming communication to displaying a visible notification.

18. The receiver wireless device of claim 13, wherein the processor is further configured with processor-executable instructions to modify the notification of the incoming communication to providing a haptic notification.

19. The receiver wireless device of claim 13, wherein the processor is further configured with processor-executable instructions to:
- determine one or more notification suggestions based on the received notification suggestion code;
- determine an optimal selection of the one or more notification suggestions and one or more notification settings on the receiver wireless device;
- modify the notification based on the determined optimal selection of the one or more notification suggestions and the one or more notification settings on the receiver wireless device; and
- generate the modified notification.

20. The receiver wireless device of claim 19, wherein the processor is further configured with processor-executable instructions to:
- determine whether to modify the notification based on the determined optimal selection of the one or more notification suggestions in the one or more notification settings on the wireless device; and
- determine one or more modifications to make to the notification based on the determined optimal selection in response to determining to modify the notification.

21. The receiver wireless device of claim 13, wherein the processor is further configured with processor-executable instructions such that the notification suggestion code comprises an annunciation priority; and
- wherein the processor is further configured with processor-executable instructions to generate a notification based on a user setting of the receiver wireless device appropriate for the annunciation priority.

22. A sender wireless device, comprising:
a processor configured with processor-executable instructions to:
- display notification suggestion options;
- receive an input selecting one or more of the notification suggestion options;
- generate a notification suggestion code based on the selected one or more notification suggestion options, wherein the notification suggestion code comprises one or more suggested optional modifications configured to indicate to a receiver wireless device one or more notification options that the receiver wireless device may determine to use for optionally modifying a notification of an incoming communication;
- send a communication to the receiver wireless device; and
- send the notification suggestion code to the receiver wireless device in order to enable the receiver wireless device to evaluate whether to modify a notification of the communication on the receiver wireless device based on the one or more suggested optional modifications of the notification suggestion code.

23. The sender wireless device of claim 22, wherein the processor is further configured with processor-executable instructions to generate a notification suggestion code that includes an indication of whether the receiver wireless device should mute the notification of the communication.

24. The sender wireless device of claim 22, wherein the processor is further configured with processor-executable instructions to:
- receive an input selecting an annunciation priority.

25. The sender wireless device of claim 22, wherein the processor is further configured with processor-executable instructions to:
- generate the notification suggestion code by embedding the notification suggestion code within the communication; and
- send the notification suggestion code to the receiver wireless device by sending the communication with the embedded notification suggestion code.

* * * * *